United States Patent
Yue et al.

(10) Patent No.: US 6,444,017 B1
(45) Date of Patent: Sep. 3, 2002

(54) AQUEOUS INK JET INKS FOR USE WITH COMMERCIAL OFFSET MEDIA AND OFFSET INK

(75) Inventors: Shunqiong Yue; George M. Sarkisian, both of San Diego, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/702,169

(22) Filed: Oct. 30, 2000

(51) Int. Cl.[7] .............................................. C09D 11/02
(52) U.S. Cl. ............................... 106/31.28; 106/31.58; 106/31.86; 106/31.37; 106/31.69; 106/31.43; 106/31.75
(58) Field of Search ........................... 106/31.28, 31.58, 106/31.86, 31.37, 31.69, 31.43, 31.75

(56) References Cited

U.S. PATENT DOCUMENTS

| | | | | |
|---|---|---|---|---|
| 5,877,235 A | * | 3/1999 | Sakuma et al. | 106/31.58 |
| 5,879,439 A | * | 3/1999 | Nagai et al. | 106/31.28 |
| 5,973,026 A | * | 10/1999 | Burns et al. | 106/31.6 |
| 6,004,389 A | * | 12/1999 | Yatake | 106/31.28 |

* cited by examiner

*Primary Examiner*—Helene Klemanski
*Assistant Examiner*—Veronica F. Faison

(57) ABSTRACT

The present invention is directed to aqueous based ink compositions for ink jet printing on offset media and offset ink comprising combinations of dye-based and pigment-based colorants, and optionally surfactants. Optionally solvents and binders can be also added. In another formulation, an effective amount of the combination of ink colorants, at least one surfactant, being present at from about 0.1% to 1.5% by weight and an effective amount of at least one binder (such as an acrylate binder) is disclosed.

28 Claims, No Drawings

AQUEOUS INK JET INKS FOR USE WITH COMMERCIAL OFFSET MEDIA AND OFFSET INK

FIELD OF THE INVENTION

The present invention is directed to aqueous ink jet ink compositions for use with commercial offset media and offset ink.

BACKGROUND OF THE INVENTION

In recent years, computer printer technology has evolved to a point where very high resolution images can be transferred to various media, including papers of different types. One particular type of printing involves the placement of small drops of a fluid ink onto a surface in response to a digital signal. Typically, the fluid ink is placed or jetted onto the surface without physical contact between the printing device and the surface. The specific method for which the ink is deposited onto the printing surface varies from system to system. However, two major methods include continuous ink deposit and drop-on-demand ink deposit.

With regard to continuous printing systems, inks used are typically based on solvents including methyl ethyl ketone and/or ethanol. Essentially, continuous printing systems function as a stream of ink droplets are ejected and directed by a printer nozzle. The ink droplets are directed additionally with the assistance of an electrostatic charging device in close proximity to the nozzle. If the ink is not used on the desired printing surface, the ink is recycled for later use. With regard to drop-on-demand printing systems, the ink jet inks are typically based upon water and glycols. Essentially, with these systems, ink droplets are propelled from a nozzle by heat or by a pressure wave. Additionally, all of the ink droplets are used to form the printed image and are ejected when needed.

In general, ink jet inks are either dye-based or pigment-based. Dye-based inks typically use a liquid colorant that is usually water-based to turn the media a specific color. Because of their makeup, dye-based inks are usually not waterproof and tend to be more affected by UV light. This results in the color fading or changing over time. For optimum performance, this type of ink has often required that the proper media or substrate be selected in accordance with the application. In many circumstances, if the media is too dense or hydrophobic, the ink has difficulty penetrating and beads on the surface. Conversely, if the media is too absorbent, the dot gain is too high creating a blurred image.

Pigmented inks typically use a solid colorant to achieve color. In many cases, the line quality and accuracy of plots produced by pigment-based inks are usually superior to that of dye-based inks. With pigmented inks, solid particles adhere to the surface of the substrate. Once the water in the solution has evaporated, the particles will generally not go back into solution, and are therefore more waterproof. In addition, pigmented inks are much more UV resistant than dye-based inks, meaning that it takes much longer for noticeable fading to occur.

Though pigmented inks, in some areas, exhibit superior characteristics, dyes tend to run cleaner, provide better yield, offer better particle size, and are easier to filter. Thus, dye based inks have been more often used for common applications. Additionally, dye-based inks have tended to be more chromatic and provide more highly saturated colors.

There are several reasons that ink jet printing has become a popular way of recording images on surfaces, particularly paper. Some of these reasons include low printer noise, capability of high speed recording, and multi-color recording. Additionally, these advantages can be provided at a relatively low price. However, though there has been great improvement in ink jet printing, accompanying this improvement are increased printing demands, e.g., higher speed, higher resolution, full color image formation, etc. As such, there are several features to consider when evaluating a printer ink in conjunction with a printing surface or substrate. Such features include edge acuity and optical density of the image on the surface, dry time of the ink on the substrate, adhesion to the substrate, lack of deviation of ink droplets, presence of all dots, resistance of the dried ink to water and other solvents, long-term storage stability, and long-term reliability without corrosion or nozzle clogging. Though the above list of features provides a worthy goal to achieve, there are difficulties associated with satisfying all of the above features. Often, the inclusion of an ink component meant to satisfy one of the above characteristics can prevent another characteristic from being met. Thus, most commercial inks for use in ink jet printers represent a compromise in an attempt to achieve at least an adequate response in meeting some or all of the above listed requirements.

Papers used for ink jet printing have typically included high-quality or wood-free papers designed to have high ink absorptivity or papers having a coated porous surface. These papers are functionally good for ink jet printing because the inks may be absorbed readily and dry quickly. However, such papers often do not allow for a crisp or sharp image.

Conversely, with commercial offset paper, a nonporous smooth surface may provide a good printing surface for a crisp image. However, commercial offset coated papers are significantly different than office plain papers or photo/glossy papers specifically designed for ink jet media. Typically, with commercial offset papers, the smooth nonporous surface is comprised of a coating which requires more time for aqueous fluids to penetrate than standard paper. This is because diffusion-type adsorption must generally occur with offset papers as compared with capillary-type absorption which typically occurs with respect to standard office paper and some ink jet specialty papers. Additionally, offset coatings contain polymers that are more hydrophobic, e.g., styrene-butadiene based, than paper coatings specifically designed for ink jet ink, e.g., water-soluble polymers such as polyvinyl alcohol. Thus, because offset coatings are typically hydrophobic, have poor penetration, and are smooth and non-porous, these coatings tend to interact poorly with water-based inks. In addition, classic ink jet solvents such as glycols and diols tend to perform poorly on these coatings, showing long dry times and poor spreading characteristics.

The apparent incompatibility between offset media/ink and water based ink jet inks stems from the fact that offset media such as commercial offset paper was developed primarily for use with oil-based inks. For example, coated offset media often includes a hydrophobic component such as latex binder and/or various hydrophobic polymers. To illustrate, such polymers used in offset media can include polymers, copolymers, and/or terpolymers selected from the group consisting of polystyrene, polyolefins (polypropylene, polyethylene, polybutadiene), polyesters (PET), polyacrylate, polymethacrylate, and poly(maleic anhydride).

Because commercial offset paper provides a smooth surface for printing and would provide a convenient and inexpensive alternative to specialty papers, it would be useful provide aqueous based ink jet inks which can be used with commercial offset media, including papers and offset inks. Such formulations would be particularly useful if they exhibited a reduction in ink dry time after printing. Additionally, these ink jet inks would also be desirable if they exhibited printing properties on offset media including excellent text and area fill, minimal coalescence in half tone images, excellent optical density (OD) and edge acuity, good water fastness, good smudge and rub resistance, and good lightfastness.

SUMMARY OF THE INVENTION

The present invention is drawn to aqueous based ink compositions for ink jet printing on offset media and offset ink. One embodiment comprises effective amounts of a pigment combined with an effective amount of a dye as the ink colorants to achieve a higher optical density and neutral shade across the offset media while exhibiting good waterfastness and lightfastness. This addition of dye to the pigmented ink increases the optical density on the substrate and allows for the use of increased amounts of surfactants. Additionally, the combination of colorants produces an ink with better color neutrality and degree of coloration versus uses of only one type of colorant material. Optionally, additional dispersants, solvents, and binders can be added. Another embodiment comprises an effective amount of a combined pigment/dye colorant and an effective of surfactant to decrease dry time. The pigment is present in an amount of from about 0.5% to about 5%, preferably from about 2.5% to about 4%, by wt of ink composition. The dye is present in an amount of from about 0.1% to 5%, preferably from about 0.5% to about 2%, by weight of ink composition. The surfactant, if present, ranges in an amount of from about 0.1% to about 1.5%, preferably from about 0.4% to about 1.5%, by wt of ink composition.

DETAILED DESCRIPTION OF THE INVENTION

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms "a," "an," and "the" include plural referents unless the content clearly dictates otherwise.

"Surfactant" is a compound that contains a hydrophilic and a hydrophobic segment. Thus, when a surfactant is added to water or some other solvent, the surface tension of the system can be reduced. In general, surfactants can be used for several purposes including wetting, emulsifying, dispersing, foaming, scouring, or lubricating a system.

With this in mind, an aqueous ink composition for ink jet printing on offset media and offset ink is disclosed comprising effective amounts of ink colorant formed by the combination of a pigment and a dye. In one embodiment, an effective amount of a surfactant can be added to the composition for decrease time in drying. It is desirable to decrease dry time by adding surfactants. However, increased levels of surfactant are known to decrease optical density. It has been found herein that this decrease in optical density can be offset or eliminated by the combination of pigment/dye as the colorants. Thus, a fast drying, high optical density ink can now be formulated. This is particularly important when printing on offset media, wherein many times the paper media is non-porous with a long dry time using conventional inks.

Colorants

The ink colorant in this invention is selected from the combination of pigments and dyes.

Though no specific limitation regarding the amount of ink colorant to be used (other than an effective amount) is required, it is preferred that each ink colorant be present in the amount earlier specified herein. For example, a suitable pigmented ink colorant can be the self-dispersed carbon pigment known as CABOJET™ 300. Additionally, ink colorants such as those described in U.S. Pat. Nos. 5,356,464 and 5,709,737, the entire teachings of which are incorporated herein by reference, can also be used.

The dye or pigments may be nonionic, cationic, anionic, or mixtures thereof. Any of the color dyes or pigments known for use in ink-jet printing may be employed in the practice of this invention.

In one embodiment herein a black pigment with dispersant is utilized in combination with a dye in the ink composition. Such black pigments include any black pigment that is dispersed with a dispersant having an anionic functionality, for example, the Joncryl polymers available from S. C. Johnson Polymer (Racine, Wis.). Of course, any other dispersant exhibiting anionic charges may be employed in the practice of this invention. For a more complete discussion of black pigments and anionic dispersants see U.S. Pat. No. 5,181,045 and U.S. application, Ser. No. 08/567,974, recently issued.

The following pigments are examples of available black pigments from Columbian: Raven 7000, Raven 5750, Raven 5250, Raven 5000, and Raven 3500. The following pigments are available from Degussa: Color Black FW 200, Color Black FW 2, Color Black FW 2V, Color Black FW 1, Color Black FW 18, Color Black S 160, Color Black S 170, Special Black 6, Special Black 5, Special Black 4A, Special Black 4.

The following pigments are useful in the practice of this invention; however, this listing is not intended to limit the invention. The following pigments are available from BASF: Paliogen Orange, Heliogen Blue L 6901F, Heliogen Blue NBD 7010, Heliogen Blue K 7090, Heliogen Blue L 7101F, Paliogen Blue L 6470, Heliogen Green K 8683, and Heliogen Green L 9140. The following pigments are available from Cabot: Monarch 1400, Monarch 1300, Monarch 1100, Monarch 1000, Monarch 900, Monarch 880, Monarch 800, Monarch 700, Black Pearl 1400, Black Pearl 1300, Black Pearl 1100, Black Pearl 1000, Black Pearl 900, Black Pearl 880, Black Pearl 800, and Black Pearl 700. The following pigments are available from Ciba-Geigy: Chromophtal Yellow 3G, Chromophtal Yellow GR, Chromophtal Yellow 8G, Igrazin Yellow 5GT, Igralite Rubine 4BL, Monastral Magenta, Monastral Scarlet, Monastral Violet R, Monastral Red B, and Monastral Violet Maroon B. The following pigments are available from Degussa: Printex U, Printex V, Printex 140U, and Printex 140V. The following pigment is available from DuPont: Tipure R-101. The following pigments are available from Heubach: Dalamar Yellow YT-858-D and Heucophthal Blue G XBT-583D. The following pigments are available from Hoechst: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, Novoperm☐ Yellow HR, Novoperm Yellow FGL, Hansa Brilliant Yellow 10GX, Permanent Yellow G3R-01, Hostaperm Yellow H4G, Hostaperm Yellow H3G, Hostaperm Orange GR, Hostaperm Scarlet GO, and Permanent Rubine F6B. The following pigments are available from Mobay: Quindo Magenta, Indofast Brilliant Scarlet, Quindo Red R6700, Quindo Red R6713, and Indofast Violet. The following pigments are available from Sun Chem: L74-1357 Yellow, L75-1331 Yellow, and L75-2577 Yellow.

Examples of water-soluble dyes include the sulfonate and carboxylate dyes, specifically, those that are commonly employed in ink-jet printing. Specific examples include: Sulforhodamine B (sulfonate), Acid Blue 113 (sulfonate), Acid Blue 29 (sulfonate), Acid Red 4 (sulfonate), Rose Bengal (carboxylate), Acid Yellow 17 (sulfonate), Acid Yellow 29 (sulfonate), Acid Yellow 42 (sulfonate), Acridine Yellow G (sulfonate), Nitro Blue Tetrazolium Chloride Monohydrate or Nitro BT, Rhodamine 6G, Rhodamine 123, Rhodamine B, Rhodamine B Isocyanate, Safranine O, Azure B, Azure B Eosinate, Basic Blue 47, Basic Blue 66, Thioflacin T (Basic Yellow 1), and Auramine O (Basic Yellow 2), all available from Aldrich Chemical Company.

One type of preferred colorant employed in the inks of this invention is a self-dispersing pigment. Such pigments suitable for use herein include all chemically modified water-dispersible, pigments known for use in ink-jet printing. These chemical modifications impart water-dispersiblity to the pigment precursors that encompass all organic pigments.

For self-dispersibility or water solubility, the pigments herein are modified by the addition of one or more organic groups comprising at least one aromatic group or a C1–C12 alkyl group and at least one ionic group or ionizable group. The ionizable group is one that forms its ionic groups in the aqueous medium. The ionic group may be anionic or cationic. The aromatic groups may be further substituted or unsubstituted. Examples include phenyl or napthyl groups and the ionic group is sulfonic acid, sulfinic acid, phosphonic acid, carboxylic acid, ammonium, quaternary ammonium, or phosphonium group.

Depending on the process selected, the pigment can either be anionic or cationic in character. As commercially available, the anionic chromophores are usually associated with sodium or potassium cations, and the cation chromophores are usually associated with chloride or sulfate anions.

For modification, one preferred method is treatment of the carbon black pigment with aryl diazonium salts containing at least one acidic functional group. Examples of aryl diazonium salts include those prepared from sulfanilic acid, 4-aminobenzoic acid, 4-aminosalicylic acid, 7-amino4-hydroxy-2-naphthlenesulfonic acid, aminophenylboronic acid, and aminophenylphosphonic acid and metanilic acid.

Ammonium, quaternary ammonium groups, quaternary phosphonium groups, and protonated amine groups represent examples of cationic groups that can be attached to the same organic groups discussed above.

See U.S. Pat. Nos. 5,707,432; 5,630,868; 5,571,311; and 5,554,739 for a discussion of modified carbon black pigments and methods of attaching the functionalized groups.

The following pigments are useful in the practice of this invention; however, this listing is not intended to limit the invention. The following pigments available from Cabot may be appropriately surface modified for the purpose of use in this invention: Monarch® 1400, Monarch® 1300, Monarch® 1100, Monarch® 1000, Monarch® 900, Monarch® 880, Monarch® 800, and Monarch® 700. Likewise the following pigments available from Columbian may be appropriately surface modified: Raven 7000, Raven 5750, Raven 5250, Raven 5000, and Raven 3500. The following pigments are available from Degussa: Color Black FW 200, Color Black FW 2, Color Black FW 2V, Color Black FW 1, Color Black FW 18, Color Black S160, Color Black FW S1 70, Special Black 6, Special Black 5, Special Black 4A, Special Black 4, Printex U, Printex 140U, Printex V, and Printex 140V. Tipure® R-101 is available from DuPont. Cab-O-Jet® 200 and Cab-O-Jet® 300 from Cabot is surface modified and may be used as is.

Surfactants

Also, an aqueous ink composition for ink jet printing on offset media and offset ink is also disclosed comprising an effective amount of ink colorant and at least one surfactant. The surfactant can be nonionic, cationic, anionic and amphoteric in nature. In one embodiment nonionic surfactant is preferred.

Suitable nonionic surfactants for use can include alkoxylated octylphenols, alkyl phenoxypoly(ethleneoxy)ethanols, silicone glycol copolymers including polyalkylene oxide-modified polydimethylsiloxanes, alkoxlyated tetramethyl decyndiols, alkoxylated trimethylnonanols, polyoxyethylene ethers, ethylene oxide/propylene oxide copolymers, fluorosurfactants, and nonionic alkoxylated surfactants. Preferred alkoxylates for above are ethoxylate and propoxylates.

Other examples of suitable surfactants include sulfosuccinates, diphenyl sulfonate derivatives, nonylphenyl sulfonate derivatives, alkyl polyethylene alkyl phenyl polyethylene oxide surfactants, (polyethylene oxide block copolymers), acetylenic polyethylene oxides, POE (polyethylene oxide) esters, POE diesters, POE amines, POE amides, and dimethicone copolyols. Amphoteric surfactants such as substituted amine oxides are useful in the practice of this invention. Cationic surfactants such as protonated POE amines may also be used. U.S. Pat. No. 5,106,416, discloses more fully most of the surfactants listed above. Specific examples of amphiphiles/surfactants that are preferably employed in the practice of this invention include iso-hexadecyl ethylene oxide 20 and amine oxides, such as N,N-dimethyl-N-dodecyl amine oxide, N,N-dimethyl-N-tetradecyl amine oxide, N,N-dimethyl-N-hexadecyl amine oxide, N,N-dimethyl-N-octadecyl amine oxide, N,N-dimethyl-N-(Z-9-octadecenyl)-N-amine oxide.

Other Optional Components

In one embodiment, the binder can preferably be an acrylate binder (water soluble or water dispersible), such as acrylate polymers, acrylic acids, methacrylate acids including its esters, and combinations thereof. Additionally, other water-insoluble monomers can be used for the binder. For example, the binder can be comprised of comonomers such as a styrene and a butyl methacrylate. Other suitable binders that can be used include polyamides, vinylalcohols, vinyl acetates, polyvinylpyrrolidones, cellulosics, and urethanes. If utilized herein, the binder should be present at from about 0.01% to 10% by weight. Solvents can also be added to the formulations for good results. Such solvents can include alcohols and polyhydroxylated solvents including glycerols, glycols, glycol ethers, pyrrolidones, and combinations thereof. When using one of these or other solvents, the solvent should be present at from 0.5 to 50% by weight. Additionally, as stated previously with respect to other embodiments, the nonionic surfactant(s) can be selected from the group consisting of alkoxylated octylphenols, alkyl phenoxypoly(alkyleneoxy)ethanols, silicone glycol copolymers including polyalkylene oxide-modified polydimethylsiloxanes, alkoxlyated tetramethyl decyndiols, alkoxylated trimethylnonanols, polyoxyethylene ethers, ethylene oxide/propylene oxide copolymers, fluorosurfactants, and nonionic alkoxylated surfactants.

Biocides may be used in the ink composition to inhibit growth of microorganisms. Preferred examples of biocides include Urarcide™ and Proxel™, and NuoCept™. Sequestering agents such as EDTA may be included to eliminate deleterious effects of heavy metal impurities, and buffer solutions may be used to control the pH of the ink. Other known additives such as viscosity modifiers and other acrylic or non-acrylic polymers may be added to improve various properties of the ink compositions as desired.

The inks are formulated by combining the various components of the vehicle and mixing them with the colorants and polymers disclosed herein. The viscosity of the final ink composition is from about 0.8 to about 8 cPs, preferably from about 0.9 to about 4 cPs.

As water is the major component in typical ink jet ink formulations, in the prior art, offset coatings have tended to interact poorly with aqueous inks. In addition, classic ink jet solvents such as glycols and diols tend to perform poorly alone on these coatings, showing long dry times and poor spreading characteristics. Prior to the present invention, offset media was typically printed on using water insoluble solvents (xylene or toluene) and oils (linseed or soybean) in the ink formulation. Because these components are incompatible with water, they are difficult to jet out of an ink jet pen. By adding surfactants to aqueous based dye/pigmented inks as prescribed herein, dry time and spreading on the offset media and offset ink can be improved. Additionally, such formulations can be used in an ink jet pen with good reliability. The use of surfactants as disclosed herein also reduces the amount of heating required to dry inks. As offset papers are often hydrophobically coated, massive amounts of heat may otherwise be required to dry inks, leading to the cost and size of a given printing device to be increased. By improving the penetration of the ink into the coatings through the use of surfactants, less heat is required to remove the fluid at the surface of the paper. Thus, reduction of ink transfer from sheet to sheet is effectuated.

Another advantage of the present invention is cost savings and convenience to consumers. Commercial offset paper is often much less expensive and are much more available than specialty media paper designed specifically for certain ink jet inks. As the ink jet inks of the present invention have decreased dry time on commercial offset paper, overall printing speed can also be maintained at an acceptable level.

A method of ink-jet printing is also disclosed herein. The inks of this invention may be used in any conventional ink-jet or bubble-jet or piezoelectric printer. Preferably the inks are used in thermal ink-jet printers. The ink is typically charged into a printer cartridge and printed on any medium. Examples of suitable media for printing include paper, textiles, wood, and plastic; however, of great note is the ink's performance on offset media.

Offset Media

Examples of offset media include CAROLINA™ Cover, LUSTRO™ Laser gloss (from S. D. Warren), KROMCOTE™ (from Champion papers), and UTOPIA™ Dull (Appleton Papers).

Typically offset media is used to describe media which has a nonporous surface or a glossy surface after treatment with various coating and displays significantly less absorption of inks compared to plain white paper.

EXAMPLES

The following examples illustrate various formulations for preparing the ink jet ink compositions of the present invention, as well as provide data showing the effectiveness of various pigment/dye combinations with the additional of surfactants compared to one another as well as compared to other formulations without the dye/pigment combination. The following examples should not be considered as limitations of the present invention, but should merely teach how to make the best-known ink formulations based upon current experimental data.

EXAMPLE I

The following ink formulas were made using conventional ink mixing techniques.

| Ink Formula | A % | B % | C % | D % | E % |
|---|---|---|---|---|---|
| Self-dispersing Pigment Black | 3 | 0 | 3 | 0 | 3 |
| 20% Binder | 5 | 0 | 5 | 0 | 5 |
| Black dye | 0 | 2 | 2 | 0 | 0 |
| Black dye | 0 | 0 | 0 | 2 | 2 |
| Red Dye | 0 | 0 | 0 | 0.20 | 0.20 |
| Solvent | 0.60 | 0.60 | 0.60 | 0.60 | 0.60 |
| Surfactant | 0.20 | 0.20 | 0.20 | 0.20 | 0.20 |
| Surfactant | 0.30 | 0.30 | 0.30 | 0.30 | 0.30 |
| Solvent | 6 | 6 | 6 | 6.00 | 6 |
| Polyethylene Glycol | 3.50 | 3.50 | 3.50 | 3.50 | 3.50 |
| Biocide | 0.20 | 0.20 | 0.20 | 0.20 | 0.20 |
| Water | To 100% | To 100% | To 100% | To 100% | To 100% |
| Media Tested | | | OD Measurements | | |
| Cascade Offset | 0.96 | 0.74 | 1.07 | 0.78 | 1.16 |
| Hammermill Fore DP | 1.01 | 0.73 | 1.06 | 0.77 | 1.19 |
| Lustro Laser | 1.59 | 0.64 | 1.65 | 0.67 | 1.73 |
| Kromekote | 1.57 | 0.52 | 1.51 | 0.44 | 1.88 |

As can be seen, Ink Formulas C and E, with a combination of pigment and dye, display increased OD as compared to formulas A, B, and D, with only a dye or pigment present.

EXAMPLE II

The ink compositions of Example I were evaluated by a calorimeter. The results are tabulated below.

| | CIELab Values of Example Inks | | | | | | | | |
|---|---|---|---|---|---|---|---|---|---|
| | Ink A | | | Ink B | | | Ink C | | |
| Media | L | a | b | L | a | b | L | a | b |
| Cascade Offset | 41.64 | 0.81 | 2.03 | 47.06 | −0.42 | −7.34 | 34.86 | 0.03 | −1.39 |
| Hammermill | 39.01 | 0.64 | 1.77 | 47.93 | −0.73 | −7.79 | 35.43 | −0.21 | −1.54 |
| Lustro Laser | 21.11 | 2.01 | 1.25 | 53.77 | 1.81 | −8.09 | 18.53 | 1.44 | −0.63 |
| Kromekote | 19.61 | 2.14 | 2.86 | 60.79 | 4.09 | −6.73 | 22.01 | 2.35 | 1.11 |
| | Ink A | | | Ink D | | | Ink E | | |
| | L | a | b | L | a | b | L | a | b |
| Cascade Offset | 41.64 | 0.81 | 2.03 | 47.11 | −3.01 | −3.31 | 31.82 | −0.28 | 0.19 |
| Hammermill | 39.01 | 0.64 | 1.77 | 47.96 | −2.85 | 4.12 | 30.89 | −0.35 | 0.08 |
| Lustro Laser | 21.11 | 2.01 | 1.25 | 52.01 | −2.75 | −6.94 | 16.21 | 1.16 | −1.45 |
| Kromekote | 19.61 | 2.14 | 2.86 | 62.08 | −2.81 | −5.05 | 13.22 | 1.28 | −0.99 | a is a measure of the degree of redness to greenness. Zero is neutral.
b is a measure of the degree of yellowness to blueness. Zero in neutral.
L is a measure of the degree of lightness. A lower value indicates a better black color for printing purposes.

As can be seen in the table, both inks, C and E from Example I, provide a and b values closer to zero which is an indication of neutrality. Therefore, the combination of pigment and dye provides for less tone defect across all media tested. The L values for the above black inks above indicate that inks C and E provide for a better black coloration as well.

We claim:
1. An aqueous offset ink composition comprising:
   a) from about 0.1% to about 5% of a dye-based colorant; and b) from about 0.5% to about 5% of a pigment based colorant; wherein said ink composition is used for printing on offset media.

2. The aqueous ink composition of claim 1 wherein said ink composition is a black ink.

3. The aqueous ink composition of claim 1 wherein said ink colorant is selected from the group consisting magenta, cyan, or yellow inks.

4. The aqueous ink composition of claim 1 further comprising from about 0.1% to about 1.5% of a surfactant.

5. The aqueous ink composition of claim 1, further comprising a water soluble or water dispersible polymeric binder being present at from about 0.01% to 10% by weight.

6. The aqueous ink composition of claim 5 wherein the binder is selected from the group consisting of acrylates, polyamides, vinyl alcohols, vinyl acetates, polyvinylpyrrolidones, cellulosics, urethanes, and combinations thereof.

7. The aqueous ink composition of claim 6 wherein the binder is an acrylate binder.

8. The aqueous ink composition of claim 4 wherein the surfactant is selected from the group consisting of sulfosuccinates, diphenyl sulfonate derivatives, nonylphenyl sulfonate derivatives, alkoxylated octylphenols, alkyl phenoxypoly(alkyleneoxy)ethanols, silicone glycol copolymers, polyalkylene oxide-modified polydimethylsiloxanes, alkoxlyated tetramethyl decyndiols, secondary alcohol alkoxylates, alkoxylated trimethylnonanols, polyoxyethylene ethers, ethylene oxide/propylene oxide copolymers, fluorosurfactants, alkyl polyethylene alkyl phenyl polyethylene oxide surfactants, (polyethylene oxide block copolymers), acetylenic polyethylene oxides, POE (polyethylene oxide) esters, POE diesters, POE amines, POE amides, dimethicone copolyols, substituted amine oxides, protonated POE amines, iso-hexadecyl ethylene oxide 20, N,N-dimethyl-N-dodecyl amine oxide, N,N-dimethyl-N-tetradecyl amine oxide, N,N-dimethyl-N-hexadecyl amine oxide, N,N-dimethyl-N-octadecyl amine oxide, N,N-dimethyl-N-(Z-9-octadecenyl)-N-amine oxide and combinations thereof.

9. The aqueous ink composition of claim 8 wherein at least one of the surfactants is nonionic.

10. A method of offset inkjet printing wherein an ink composition comprising a combination of pigment and dye colorants is printed onto offset media.

11. The method of claim 10 wherein said offset media is substantially non-porous compared to plain white paper.

12. The method of claim 10 wherein said ink composition is a black ink.

13. The method of claim 10 wherein said ink colorant is selected from the group consisting magenta, cyan, or yellow inks.

14. The method of claim 10 wherein the dye colorant is present at from 0.1% to 50% by weight.

15. The method of claim 10 wherein the pigment colorant is present at from about 0.5% to 5% by weight.

16. The method of claim 10 further comprising from about 0.1% to about 1.5% of a surfactant.

17. The method 10 further comprising a water soluble or water dispersible polymeric binder being present at from about 0.01% to 10% by weight.

18. The method of claim 16 wherein the binder is selected from the group consisting of acrylates, polyamides, vinyl alcohols, vinyl acetates, polyvinylpyrrolidones, cellultosics, urethanes, and combinations thereof.

19. The method of claim 18 wherein the binder is an acrylate binder.

20. A printer system comprising an offset ink containing
i) from about 0.1% to about 5% of a dyebased colorant; and
ii) from about 0.5% to about 5% of a pigment-based colorant; an inkjet printer; and offset media; wherein said printer used for printing the offset ink onto the offset media.

21. The printer system of claim 20 wherein said ink composition is a black ink.

22. The printer system of claim 20 wherein said ink colorant is selected from the group consisting magenta, cyan, or yellow inks.

23. The printer system of claim 20 further comprising from about 0.1% to about 1.5% of a surfactant.

24. The printer system of claim 20 further comprising a water soluble or water dispersible polymeric binder being present at from about 0.01% to 10% by weight.

25. The printer system of claim 20 wherein the binder is selected from the group consisting of acrylates, polyamides, vinyl alcohols, vinyl acetates, polyvinylpyrrolidones, cellulosics, urethanes, and combination thereof.

26. The printer system of claim 20 wherein the binder is an acrylate binder.

27. The printer system of claim 20 wherein the surfactant is selected from the group consisting of sulfosuccinates, diphenyl sulfonate derivatives, nonylphenyl sulfonate derivatives, alkoxyloted octylphenols, alkyl phenoxypoly(alkyleneoxy)ethanols, silicone glycol copolymers, polyalkylene oxide-modified polydimethylsiloxanes, alkoxlyated tetramethyl decyndiols, secondary alcohol alkoxylates, alkoxylated trimethylnonanols, polyoxyethylene ethers, ethylene oxide/propylene oxide copolymers, fluorosurfactants, alkyl polyethylene alkyl phenyl polyethylene oxide surfactants, (polyethylene oxide block copolymers), acetylenic polyethylene oxides, POE (polyethylene oxide) esters, POE diesters, POE amines, POE amides, dimethicone copolyols, substituted amine oxides, protonated POE amines, iso-hexadecyl ethylene oxide 20, N,N-dimethyl-N-dodecyl amine oxide, N,N-dimethyl-N-tetradecyl amine oxide, N,N-dimethyl-N-hexodecyl amine oxide, N,N-dimethy-N-octadecyl amine oxide, N,N-dimethyl-N-(Z-9-octadecenyl)-N-amine oxide, and combinations thereof.

28. The printer system of claim 20 wherein at least one of the surfactants is nonionic.

* * * * *